(12) United States Patent
Okuyama et al.

(10) Patent No.: US 7,493,023 B2
(45) Date of Patent: Feb. 17, 2009

(54) APPARATUS AND METHOD FOR GENERATING DATA STREAM AND RECORDING/REPLAYING APPARATUS USING THE SAME

(75) Inventors: Tomoyuki Okuyama, Tokyo (JP); Akihisa Nomura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 1164 days.

(21) Appl. No.: 10/131,208

(22) Filed: Apr. 25, 2002

(65) Prior Publication Data

US 2002/0159758 A1 Oct. 31, 2002

(30) Foreign Application Priority Data

Apr. 27, 2001 (JP) .............................. 2001-132816

(51) Int. Cl.
*H04N 5/91* (2006.01)
*H04N 7/00* (2006.01)
*H04N 9/79* (2006.01)
*H04N 7/26* (2006.01)

(52) U.S. Cl. ........................... 386/95; 386/45; 386/125; 386/126; 386/98; 386/111

(58) Field of Classification Search .................... 386/45, 386/95, 125–126, 111–112, 98
See application file for complete search history.

(56) References Cited

U.S. PATENT DOCUMENTS 5,838,678 A * 11/1998 Davis et al. .................. 370/389
5,852,669 A * 12/1998 Eleftheriadis et al. ....... 382/118
5,905,845 A * 5/1999 Okada et al. .................. 386/98
6,212,208 B1 * 4/2001 Yoneda et al. ............... 370/538
6,504,993 B1 1/2003 Matsumoto (Continued)

FOREIGN PATENT DOCUMENTS

EP 0 782 137 A2 7/1997

(Continued)

OTHER PUBLICATIONS

Patent Abstracts of Japan, vol. 2000, No. 1, Jan. 31, 2000 & JP 11 288562 (Sanyo Electric Co. Ltd.), Oct. 19, 1999, abstract.

(Continued)

*Primary Examiner*—Thai Tran
*Assistant Examiner*—Daquan Zhao
(74) *Attorney, Agent, or Firm*—Foley & Lardner LLP (57) ABSTRACT

A data stream generating apparatus for a recording/replaying apparatus includes a storage unit and a control module. The control module generates a video elementary stream and an audio elementary stream from inputted video data and audio data to store in the storage unit, and generates and stores a navigation pack in the storage unit. The control module determines an output order of the navigation pack, a plurality of video packs generated from the video elementary stream and a plurality of audio packs generated from the audio elementary stream based on a unit size of an output data stream, a data quantity of the video elementary stream and a data quantity of the audio elementary stream, while updating the navigation pack. Then, the control module outputs the navigation pack, the plurality of video packs, and the plurality of audio packs as an output data stream based on the output order.

15 Claims, 10 Drawing Sheets

U.S. PATENT DOCUMENTS

| | | |
|---|---|---|
| 6,574,417 B1 * | 6/2003 | Lin et al. ............ 386/70 |
| 6,778,759 B1 * | 8/2004 | Yamada et al. ......... 386/95 |
| 2001/0009605 A1 | 7/2001 | Ando et al. |
| 2001/0010755 A1 | 8/2001 | Ando et al. |
| 2001/0012443 A1 | 8/2001 | Ando et al. |
| 2001/0014201 A1 | 8/2001 | Ando et al. |

FOREIGN PATENT DOCUMENTS

| | | |
|---|---|---|
| EP | 0 805 601 A2 | 11/1997 |
| EP | 0805601 * | 11/1997 |
| JP | 10-1991140 A | 7/1998 |
| JP | 11-232792 A | 8/1999 |
| JP | 11-288562 | 10/1999 |
| JP | 11-341420 | 12/1999 |
| JP | 2000-268537 | 9/2000 |
| JP | 2000-285648 | 10/2000 |

OTHER PUBLICATIONS

Product Letter "μPD61050" [S13503JJ1V1PL00 Nov. 1998 NEC Corporation] pp. 1-7.

* cited by examiner

APPARATUS AND METHOD FOR GENERATING DATA STREAM AND RECORDING/REPLAYING APPARATUS USING THE SAME

BACKGROUND OF THE INVENTION

1. Field of the Invention

The present invention relates to an apparatus and method for encoding data and generating a data stream. More particularly, the present invention relates to an apparatus and method of generating a data stream of the DVD standard or MPEG standard from video data and audio data and a recording/replaying apparatus for the same.

2. Description of the Related Art

A conventional MPEG encoder has a typical stream buffer with substantially the same capacity as an MPEG decoder. The MPEG encoder multiplexes video/audio elementary streams (ES) generated in real time using the stream buffer. A packaging order is determined one by one based on data quantities of video elementary stream (ES) and audio elementary stream (ES) in the stream buffer every time each of packs is outputted.

As shown in Japanese Laid Open Patent Applications (JP-P2000-268537A and JP-P2000-285648A), a video file is comprised of a plurality of program chains, and each program chain is comprised of a plurality of programs. Each program is comprised of a plurality of cells, and each cell is comprised of a plurality of video object units (hereinafter, to be referred to as "VOBU"). Each VOBU is comprised of a plurality of kinds of packs. As these packs, there are a navigation pack, a video pack, an audio pack, a sub picture pack and so on. The pack is comprised of one or more packets and a pack header, and is the minimum unit for a data transfer process. On the other hand, the minimum unit for a logical process is a cell.

Figure 1:
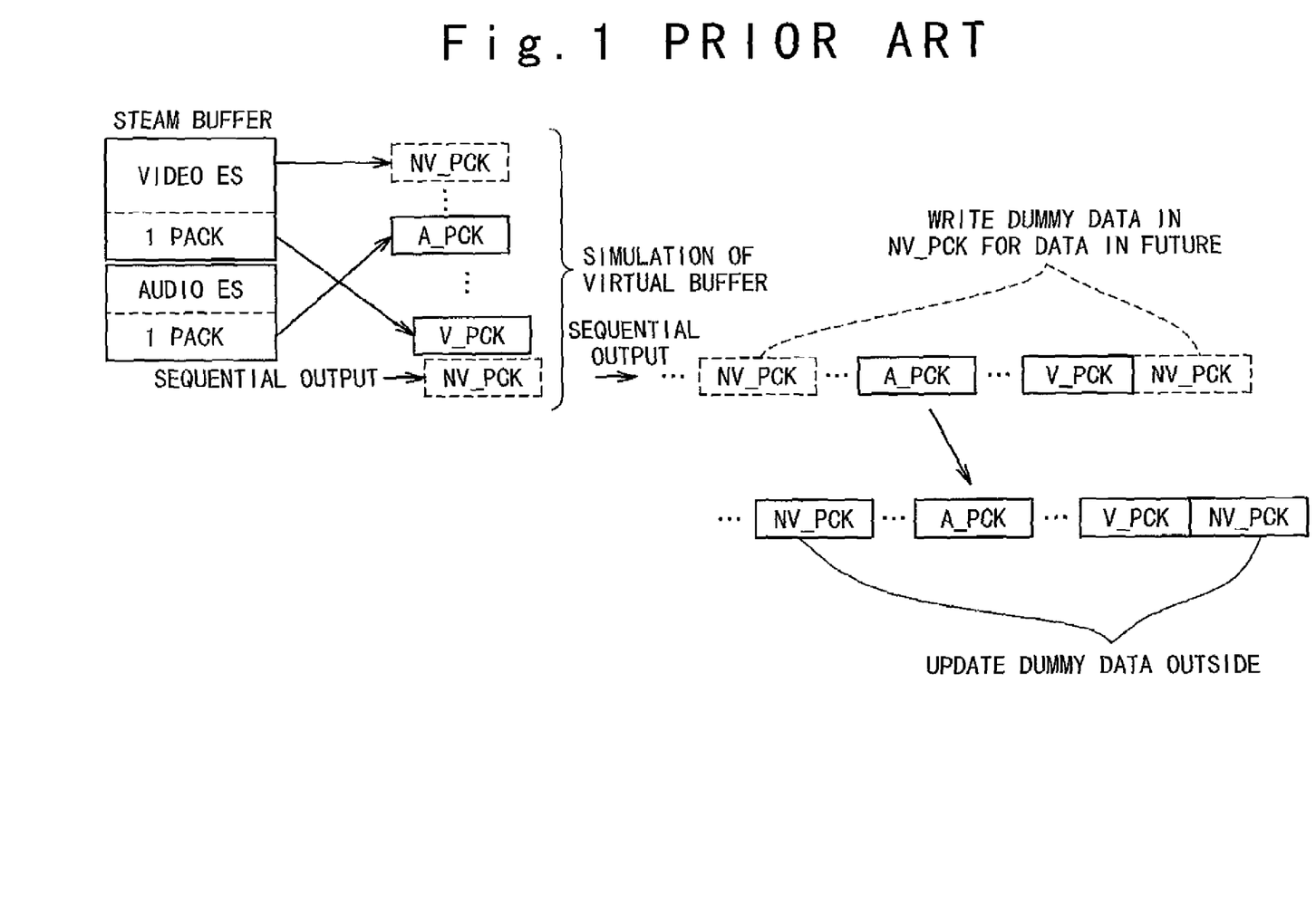
FIG. 1 is a diagram showing a process that packs are outputted from a stream buffer in a conventional recording apparatus.

In the conventional DVD apparatus, a small stream buffer with the capacity equal to or less than 1 VOBU is used for each of the video elementary stream (ES) and the audio elementary stream (ES), as shown in FIG. 1. The video elementary stream (ES) and the audio elementary stream (ES) are sequentially read out from the stream buffer. After that, a simulation is carried out to check whether a virtual buffer equivalent to the buffer of a decoder overflows or underflows, and the read out video/audio elementary streams (ES) are packaged as packs. The data stream generated in this way is outputted from the data stream generating apparatus. After that, when the data streams of the following VOBUs are generated, information in the navigation pack NV_PCK of the data stream outputted previously is updated based on them outside and then is written in a disk.

Figure 2:
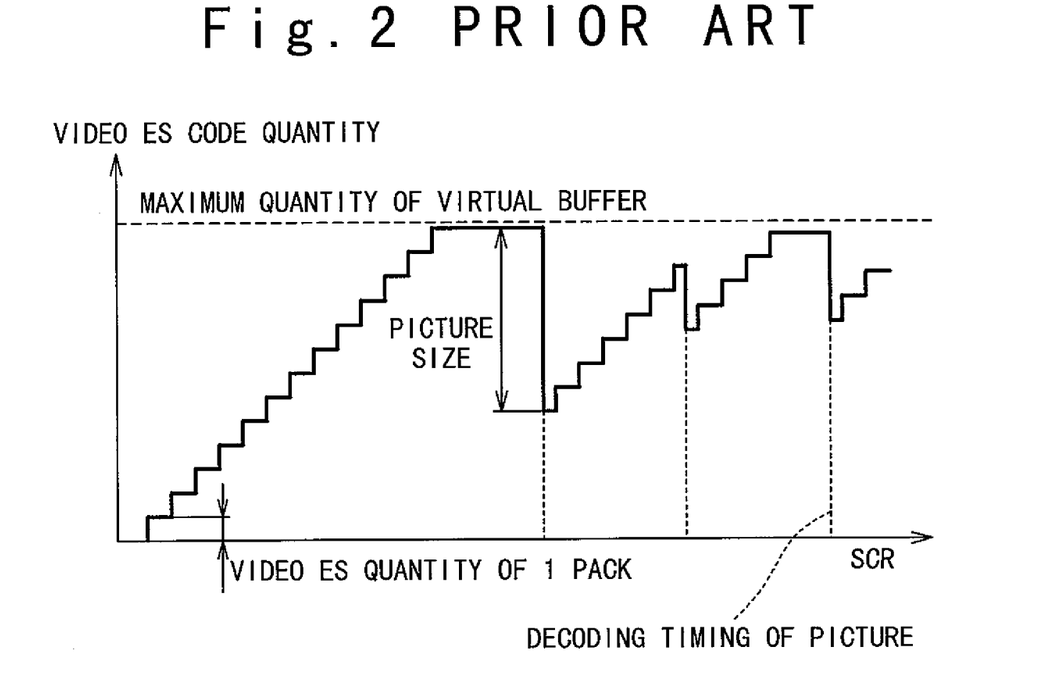
FIG. 2 is a diagram showing a simulation of a virtual buffer for video data in the conventional recording apparatus.
Figure 3:
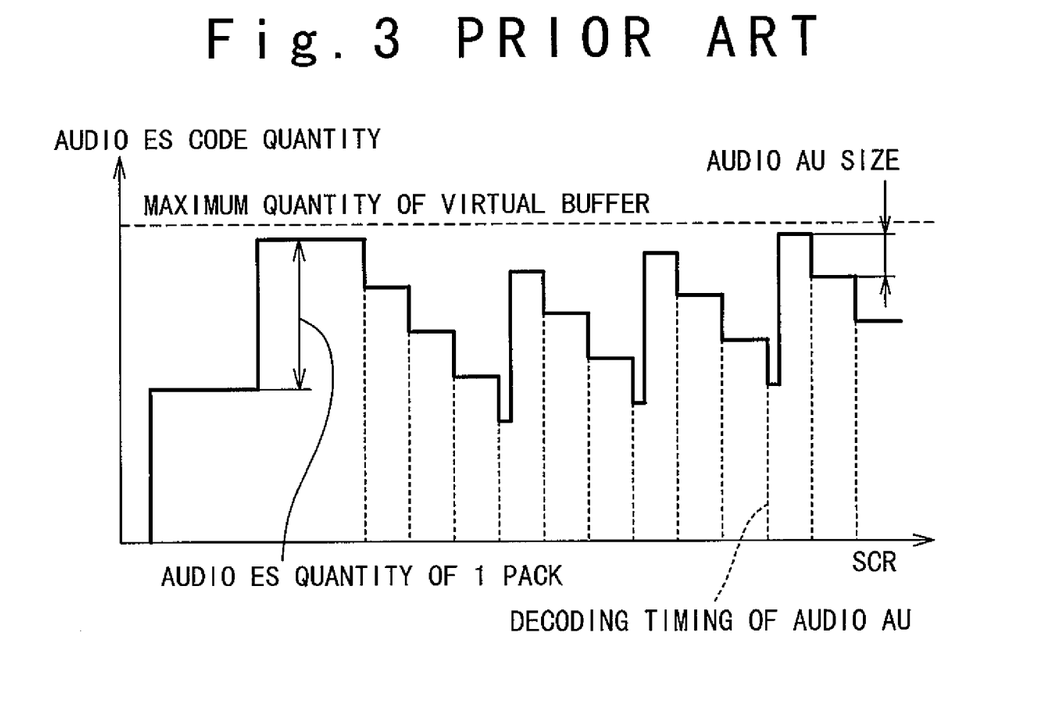
FIG. 3 is a diagram showing a simulation of a virtual buffer for audio data in the conventional recording apparatus.

The virtual buffer simulation carried out at this time is shown in FIGS. 2 and 3. FIG. 2 shows the simulation to the video data and FIG. 3 shows the simulation to the audio data.

In FIG. 3, the horizontal axis is a system clock reference (SCR) showing a read start time on a replay time axis. The vertical axis is a storage quantity of the audio data in the virtual buffer. In FIG. 3, audio packs A_PCK are transferred and the storage quantity approaches the maximum storage capacity of the virtual buffer. After that, when the audio data is not yet consumed, SCR is carried forward. After that, the audio data is consumed and an empty space increases. At this time, the empty space increases step by step because the audio data of an approximately constant data quantity is consumed and is replayed.

On the other hand, in FIG. 2, the horizontal axis is the system clock reference (SCR). The vertical axis shows the storage quantity of the video stream code in the virtual buffer. As video packs V_PCK are transferred, the storage quantity of the buffer increases step by step. When the video packs V_PCK are not yet consumed even if they are transferred to the maximum storage quantity of the virtual buffer, the virtual buffer overflows, if the video pack V_PCK is further transferred. Therefore, when the video packs V_PCK are stored to the maximum storage quantity, SCR is carried forward until an empty space is secured for the next video pack V_PCK. When the storage capacity reduces rapidly, the replay of a picture is carried out. When the replay of the picture is carried out and the necessary empty space is secured, the next video packs V_PCK corresponding to the next picture are transferred.

The navigation pack NV_PCK is a pack which should be put at the head of VOBU or each GOP (Group of Picture). Various data of VOBU must be written in the navigation pack NV_PCK. Therefore, dummy values are set instead of the data, because the data cannot be known when the navigation pack NV_PCK is outputted, and then the navigation pack NV_PCK with the dummy values is outputted. These dummy values are defined by the DVD standard, the MPEG standard and so on. After the navigation pack NV_PCK is outputted, the dummy values must be rewritten outside to correct values.

Data such as video data in VOBU (GOP) which is generated from now, an address of VOBU (GOP) which is generated from now, replay start/end data of VOBU, and VOB (video object) must be written in the navigation pack NV_PCK. To update these data, it is necessary to know each address of VOBU in the future. Therefore, dummy values are set for these data, and the navigation pack NV_PCK is outputted. In this way, the navigation pack NV_PCK is multiplexed into the stream, using the stream buffer.

Therefore, in such a conventional encoder, it is necessary to update the navigation pack NV_PCK outside. In this way, there is a problem that the data stream cannot be completed simultaneously with generation of the data stream. Moreover, there is another problem that an external circuit structure and the process become complicated to make the data stream complete, resulting in increase of cost.

In conjunction with the above description, a digital video recording system is disclosed in Japanese Laid Open Patent Application (JP-P2000-268537A). In this reference, an information recording medium stores a data object which is comprised of at least one data object unit as a predetermined data unit; data object control information; and an access unit data which is contained in the control information and is used to access an access unit as a part of the content of the data object. The recording medium further stores a bit stream which is comprised of a sequence of a plurality of packets and includes the content of the data object and the control information.

Also, a data processing apparatus is disclosed in Japanese Laid Open Patent Application (JP-A-Heisei 11-288562). In this reference, the data processing apparatus multiplexes two or more bit streams into a multiplexed stream adaptive for first standard. A pack section divides each of the bit streams into packs as processing units. A recording section extracts pack information necessary for replay of each pack from each pack. An information pack generating section sets a dummy data in a data portion of an information pack to generate the information pack which has information necessary for replay control of replay units of a second standard stream as a multiplexed stream adaptive for a second standard. A multiplexing section generates the first standard stream adaptive for the first standard by multiplexing element packs generated by the pack section and the information pack generated by the information pack generating section. A converting section converts the first standard stream into the second standard stream by substituting the pack information corresponding to the information pack for the dummy data set in the data portion.

Also, an information recording medium is disclosed in Japanese Laid Open Patent Application (JP-P2000-285648A). The information recording medium has audio object information (AOB) and management information of audio information (AMG). The audio object information includes audio only title (AOTT) containing only audio information, and audio title (ATT) containing the audio only title and AV title (AVT) of audio information with video information. The management information includes navigation information (ATT_SPRT) used for the replay of the audio title (ATT), and navigation information (AOTT_SPRT) used for the replay of the audio only tile (AOTT).

Also, in a product letter, there are shown an example of application of an MPEG encoder LSI, and the functions of the LSI. However, any technical matters of the present invention are not shown.

SUMMARY OF THE INVENTION

Therefore, an object of the present invention is to provide an apparatus and method for generating a data stream of the DVD standard or the MPEG standard in real time.

Another object of the present invention is to provide an apparatus and method for generating a data stream of the DVD standard or the MPEG standard in which the size of 1 VOBU or one or plural GOPs is fixed.

Still another object of the present invention is to provide an apparatus and method for generating a data stream of the DVD standard or the MPEG standard at high speed.

In an aspect of the present invention, a data stream generating apparatus for a recording/replaying apparatus includes a storage unit and a control module. The control module generates a video elementary stream and an audio elementary stream from inputted video data and audio data to store in the storage unit, and generates and stores a navigation pack in the storage unit. Also, the control module determines an output order of the navigation pack, a plurality of video packs generated from the video elementary stream and a plurality of audio packs generated from the audio elementary stream based on a unit size of an outputs data stream, a data quantity of the video elementary stream and a data quantity of the audio elementary stream, while updating the navigation pack. Then, the control module reads out from the storage unit and outputs the navigation pack, the plurality of video packs, the plurality of audio packs as an output data stream based on the output order.

It is desirable that the storage unit has a storage capacity more than the unit size of the outputs data stream to each of video data and audio data, and the unit size is 1 VOBU (video object unit) or 1 GOP (group of picture).

Also, it is desirable that the unit size has a previously determined number of packs. In this case, the control module may previously determine the number of packs for the unit sizes based on a bit rate of the video data, a bit rate of the audio data, a frame rate of the video data, and the number of pictures.

Also, the control module may determine the output order while carrying out a simulation to know whether or not a first virtual buffer overflows. In this case, the control module may determine the output order while adding a dummy pack when the first virtual buffer overflows.

Also, the control module may determine the output order such that the navigation pack is first outputted, a first one of the plurality of video packs is second outputted, each of a third pack and subsequent packs is one of the plurality of audio packs when the audio pack can be outputted, one of remaining video packs when the audio pack cannot outputted and the video pack can be outputted, and a dummy pack when both of the audio pack and the video pack cannot be outputted. In this case, the control module may update the navigation pack each time the output order of each of the navigation pack, the plurality of video packs, the plurality of audio packs and the dummy packs is determined.

Also, the control module may read out from the storage unit and outputs the navigation pack, the plurality of video packs, the plurality of audio packs as the output data stream based on the output order, while carrying out the simulation to know whether or not a second virtual buffer overflows.

In another aspect of the present invention, a recording/replaying apparatus includes a drive unit on which a disk is set, a data stream generating unit and a control unit. The data stream generating unit outputs an output data stream generated from video data and audio data. The control unit controls the drive unit to write the output data stream in the disk. Especially, the data stream generating unit may include a storage unit and a control module. The control module generates a video elementary stream and an audio elementary stream from inputted video data and audio data to store in the storage unit, and generates and stores a navigation pack in the storage unit. Also, the control module determines an output order of the navigation pack, a plurality of video packs generated from the video elementary stream and a plurality of audio packs generated from the audio elementary stream based on a unit size of an outputs data stream, a data quantity of the video elementary stream and a data quantity of the audio elementary stream, while updating the navigation pack. Then, the control module reads out from the storage unit and outputs the navigation pack, the plurality of video packs, the plurality of audio packs as an output data stream based on the output order.

It is desirable that the storage unit has a storage capacity more than the unit size of the outputs data stream to each of video data and audio data, and the unit size is 1 VOBU (video object unit) or 1 GOP (group of picture).

Also, it is desirable that the unit size has a previously determined number of packs. In this case, the control module may previously determine the number of packs for the unit sizes based on a bit rate of the video data, a bit rate of the audio data, a frame rate of the video data, and the number of pictures.

Also, the control module may determine the output order while carrying out a simulation to know whether or not a first virtual buffer overflows. In this case, the control module may determine the output order while adding a dummy pack when the first virtual buffer overflows.

Also, the control module may determine the output order such that the navigation pack is first outputted, a first one of the plurality of video packs is second outputted, each of a third pack and subsequent packs is one of the plurality of audio packs when the audio pack can be outputted, one of remaining video packs when the audio pack cannot outputted and the video pack can be outputted, and a dummy pack when both of the audio pack and the video pack cannot be outputted. In this case, the control module may update the navigation pack each time the output order of each of the navigation pack, the plurality of video packs, the plurality of audio packs and the dummy packs is determined.

Also, the control module may read out from the storage unit and outputs the navigation pack, the plurality of video packs, the plurality of audio packs as the output data stream based on the output order, while carrying out the simulation to know whether or not a second virtual buffer overflows.

Also, the recording/replaying apparatus may further include: a replaying unit which replays the video data and the audio data from read out data stream. In this case, the control unit may control the drive unit to read out the data stream from the disk and supplies the read out data stream to the replaying unit.

Also, it is desirable that the recording/replaying apparatus may be a DVD apparatus or an MPEG apparatus.

In still another aspect of the present invention, a data stream generating method for a recording/replaying apparatus, may be achieved by (a) determining a number of packs for a unit size; by (b) generating a video elementary stream and an audio elementary stream from video data and audio data to store in a storage unit; by (c) generating a navigation pack; by (d) determining an output order of the navigation pack, a plurality of video packs generated from the video elementary stream and a plurality of audio packs generated from the audio elementary stream in the unit size based on a unit size of an outputs data stream, a data quantity of the video elementary stream and a data quantity of the audio elementary stream, while updating the navigation pack; and by (e) reading out the navigation pack, the plurality of video packs, and the plurality of audio packs from the storage unit based on the output order to output as the output data stream.

Here, the storage unit may have a storage capacity more than the unit size of the outputs data stream to each of video data and audio data, wherein the unit size is 1 VOBU (video object unit) or 1 GOP (group of picture).

Also, the (a) determining step may be achieved by determining the number of packs for the unit sizes based on a bit rate of the video data, a bit rate of the audio data, a frame rate of the video data, and the number of pictures.

Also, the (d) determining step may be achieved by determining the output order while carrying out a simulation to know whether or not a first virtual buffer overflows.

Also, the (d) determining step may be achieved by determining the output order while adding a dummy pack when the first virtual buffer overflows.

Also, the (d) determining step may be achieved by determining the output order such that the navigation pack is first outputted, a first one of the plurality of video packs is second outputted, each of a third pack and subsequent packs is one of the plurality of audio packs when the audio pack can be outputted, one of remaining video packs when the audio pack cannot outputted and the video pack can be outputted, and a dummy pack when both of the audio pack and the video pack cannot be outputted.

Also, the (d) determining step may be achieved by updating the navigation pack each time the output order of each of the navigation pack, the plurality of video packs, the plurality of audio packs and the dummy packs is determined.

Also, the (e) reading step may be achieved by reading out from the storage unit the navigation pack, the plurality of video packs, the plurality of audio packs as the output data stream based on the output order, while carrying out the simulation to know whether or not a second virtual buffer overflows.

DESCRIPTION OF THE PREFERRED EMBODIMENTS

Hereinafter, a data stream generating apparatus in a DVD or MPEG recording/replaying apparatus of the present invention will be described in detail with reference to the attached drawings.

Figure 4:
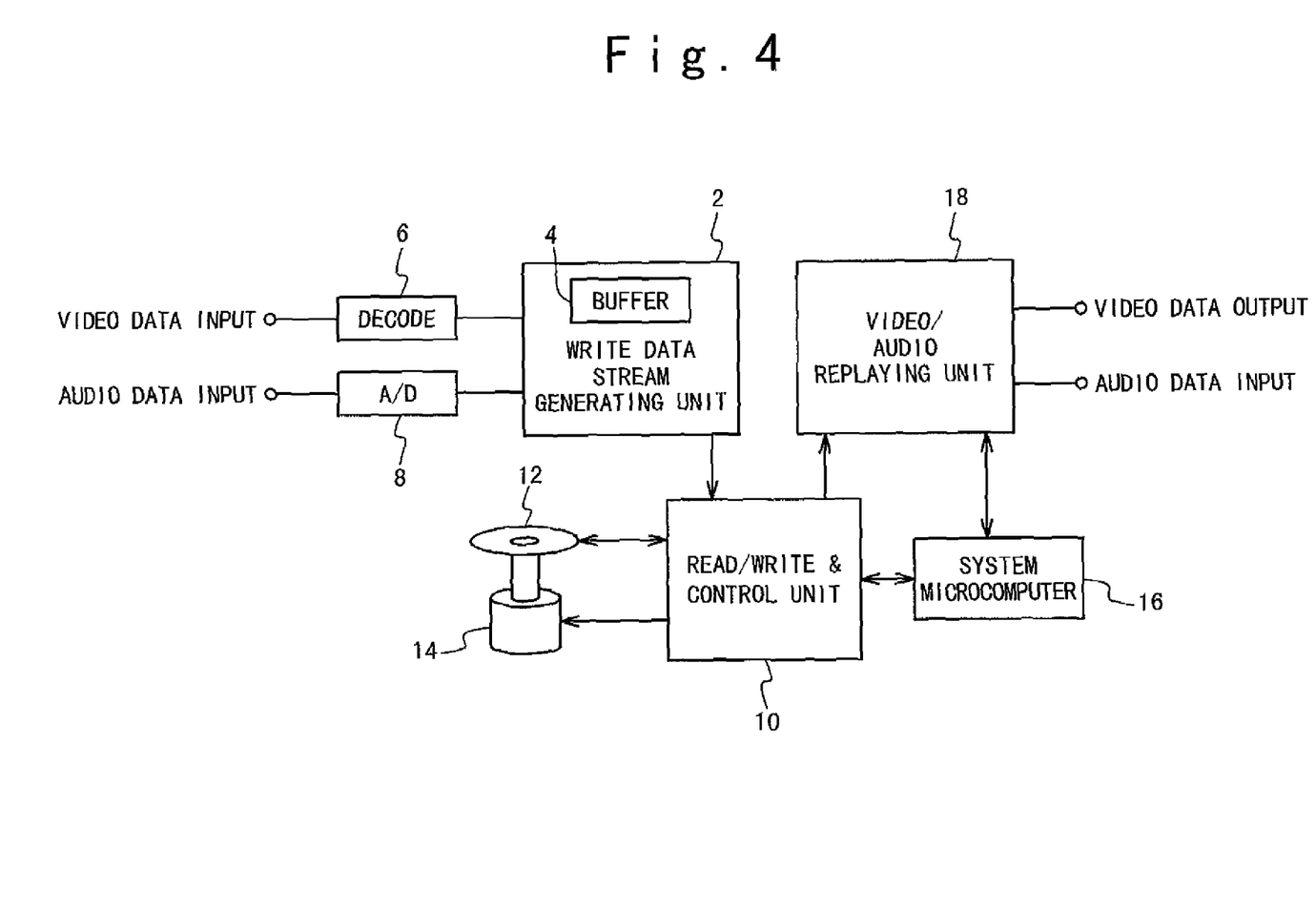
FIG. 4 is a block diagram showing the circuit structure of a DVD apparatus or an MPEG recording/replaying apparatus of the present invention.

FIG. 4 is a block diagram showing the circuit structure of the recording/replaying apparatus according to an embodiment of the present invention. Referring to FIG. 4, the recording apparatus is comprised of a data stream generation unit 2, a decoder 6, an analog-to-digital converter 8, a read/write & control unit 10, a motor 14, a system microcomputer 16, and a video/audio replaying unit 18. A DVD disk 12 is mounted on a driver containing the motor 14.

The decoder 6 decodes a video signal of the NTSC system or the PAL system, and generates and supplies video data to the data stream generating unit 2. Also, the analog-to-digital converter 8 A/D-converts an audio signal, and generates and supplies audio data to the data stream generating unit 2.

The data stream generating unit 2 multiplexes the video data from the decoder 6 and the audio data from the analog-to-digital converter 8, and generates and outputs data streams to the read/write & control unit 10. At this time, the data stream generating unit 2 has already written necessary data in a navigation pack NV_PCK in VOBU.

The read/write & control unit 10 drives and controls the driver with the motor 14, on which the DVD disk 12 is mounted, to write the data streams on the disk 12 under the control of the system microcomputer 16 in response to a write instruction. As described above, the necessary data has been already written in the navigation pack NV_PCK. Therefore, the system microcomputer 16 does not have to write the necessary data in the navigation pack NV_PCK, unlike the conventional recording apparatus. Therefore, it is possible to write the data streams on the disk 12 at high speed in real time in synchronism with the supply of the data streams.

The read/write & control unit 10 reads out the data streams from the disk 12 while controlling and driving the motor 14 and supplies them to the video/audio replaying unit 18, under the control of the system microcomputer 16 in response to a replay instruction.

The video/audio replaying unit 18 decodes the read out data streams and replays and outputs a video signal and an audio signal under the control of the system microcomputer 16.

Figure 5:
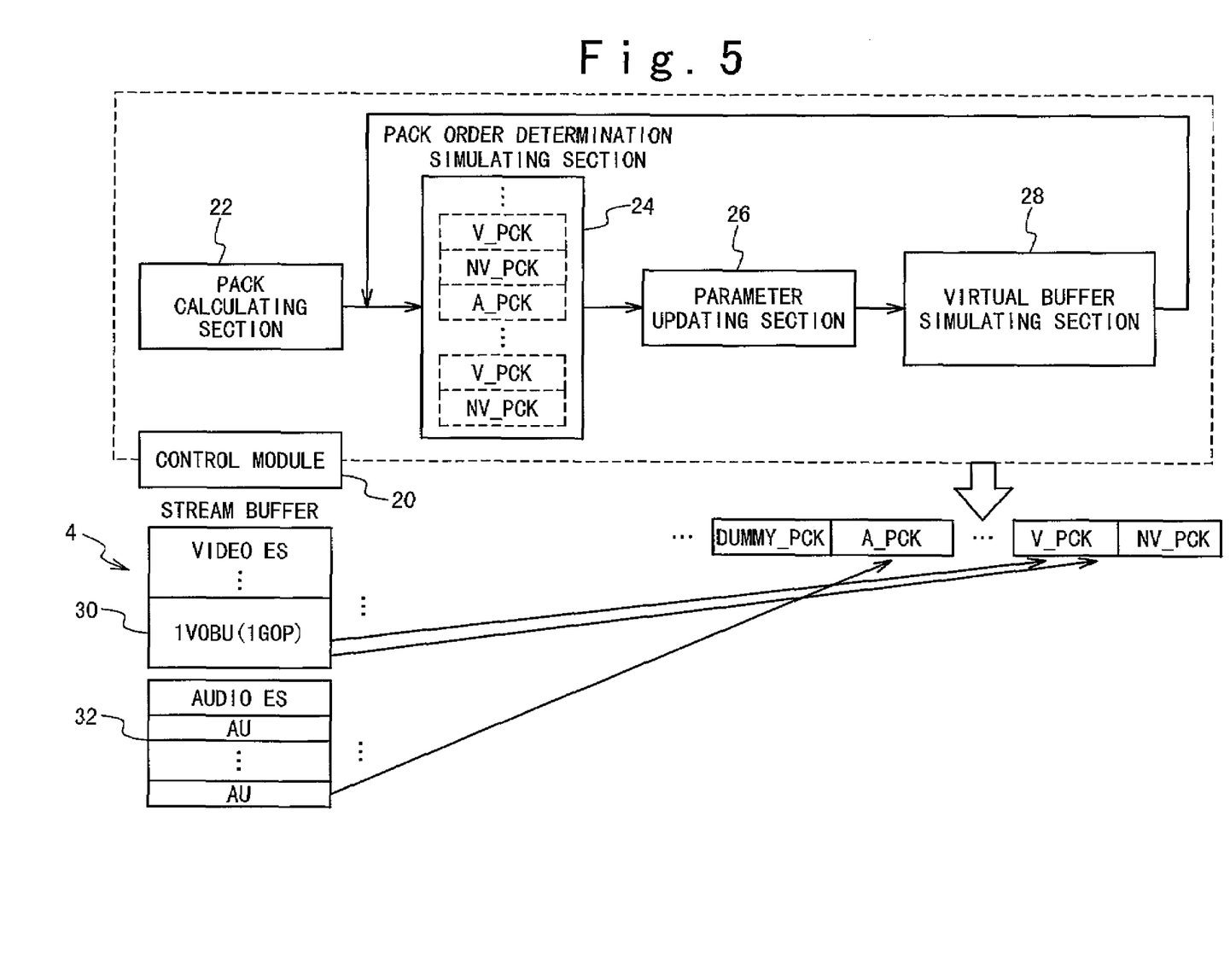
FIG. 5 is a functional block diagram showing the circuit structure of a data stream generation unit 2 of the recording/replaying apparatus of FIG. 4.

Next, the data stream generating unit 2 will be described in detail with reference to FIG. 5. In FIG. 5, the data stream generating unit 2 is comprised of a control module 20 and a stream buffer 4.

The stream buffer 4 has a buffer capacity which can store an elementary stream (ES) larger than 1 VOBU (1 GOP), when the MPEG AV encoder encodes data at a constant bit rate (CBR) at the system bit rate of the DVD video standard. That is, the stream buffer 4 has the storage capacity larger than 1 VOBU. The storage area of the stream buffer 4 is divided into a storage area 30 for a video elementary stream (ES) larger than 1 VOBU and a storage area 32 for an audio elementary stream (ES).

The control module is comprised of a pack calculating section 22, a pack order determination simulating section 24, a parameter updating section 26 and a virtual buffer simulating section 28 as an output section.

The pack number calculating section 22 determines the number of packs in 1 VOBU prior to an encoding process. The size of one pack is defined to 2048 bytes in the standard. This number of packs is fixed during the encoding process. Therefore, it is possible to previously know at what timing or in what address the next VOBU emerges. Also, because the pack size is fixed, the timing or address of the pack can be automatically known if the position of the pack is known, when various packs are arranged on one line. Therefore, the pack calculating section 22 is one of the features of the present invention.

Assuming a buffer provided for a decoding section (the video/audio replaying unit 18 in this example), a concept of a virtual buffer is introduced in the pack order determination simulating section 24. The pack order determination simulating section 34 carries out a simulation to know whether the virtual buffer overflows or underflows, taking the capacity of the virtual buffer into account. The pack order determination simulating section 34 determines the output order of packs of the elementary streams stored in the stream buffer 4 based on the calculated number of packs. Also, the pack order determination simulating section 34 generates the navigation pack NV_PCK.

The parameter updating section 26 writes data (parameters) in the navigation pack NV_PCK. As described above, the position of each pack and the position of each VOBU are previously determined. Also, the pack output order is determined by the pack order determination simulating section 24. Therefore, the parameters can be determined and written in the navigation pack NV_PCK before the data stream is outputted.

Also, the virtual buffer simulating section 28 outputs the navigation pack NV_PCK in which the parameters are written, the video packs V_PCK stored in the video elementary stream (ES) storage area 30, and the audio packs A_PCK stored in the audio elementary stream (ES) storage area 32 in the order determined by the order determination simulating section 24, while carrying out the simulation like the conventional example.

Next, the data stream generation method of the recording/replaying apparatus of the present invention will be described in detail.

The pack calculating section 22 calculates the number of packs for 1 VOBU from the bit rate of the video data and the bit rate of the audio data. The pack calculating section 22 calculates a system bit rate (SCR) using the following equation (1):

$$\text{system bit rate} = ((\text{video bit rate})*1.10 + (\text{audio bit rate}))*1.03 + (2048*8*3*(\text{frame rate of video})/N) \quad (1)$$

where N is the number of pictures contained in 1 VOBU and 15 is generally used. However, an optional value can be used. Also, the size of the pack is 2048 bytes. However, when this value must be changed, it is possible to change. The value of 1.10 is a value in which the fluctuation of the video bit rate is considered. The value of 1.03 shows the maximum ratio of a pack header to the audio elementary stream (ES).

Next, the number of packs for 1 VOBU is calculated using the following equation (2) from the system bit rate (SCR) calculated in the above equation (1).

$$(\text{the number of packs}) = (\text{system bit rate})/2048/((\text{video frame rate})*N) \quad (2)$$

Figure 6:
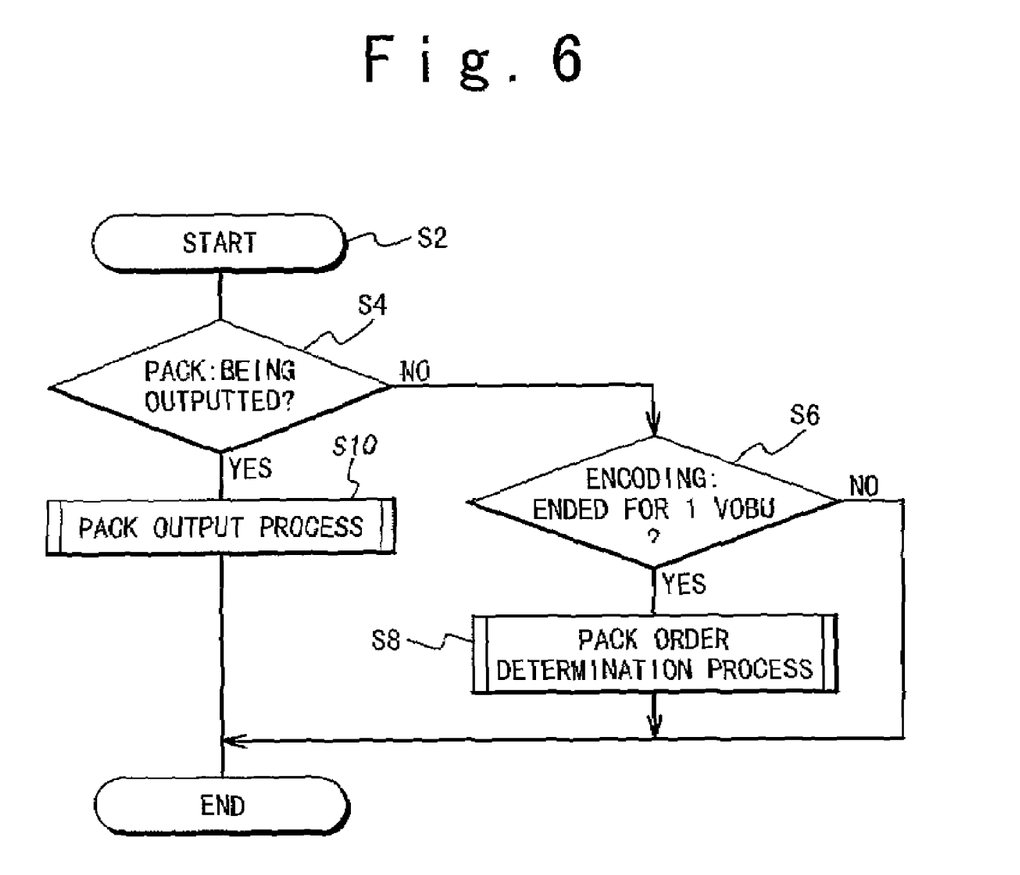
FIG. 6 is a flow chart showing the operation of the data stream generation unit.

FIG. 6 is a flow chart showing the whole operation of the data stream generating unit 2. The data stream generating unit 2 generates the appropriate navigation pack NV_PCK in real time using the determined number of packs and the stream buffer 4 and outputs the data stream.

The whole process will be described with reference to FIG. 6. In FIG. 6, when the operation is started, the above-mentioned calculation of the number of packs is carried out in an initial stage of a step S2. Subsequently, it is determined at a step S4 whether or not the packs are being outputted. When it is determined at the step S4 that the packs are being outputted, the pack output process is carried out at a step S10. When it is determined at the step S4 that the packs are not being outputted, whether or not the encoding process for 1 VOBU ended is determined. When it is determined that the encoding process for 1 VOBU has not ended yet, the process flow returns to the step S4. When it is determined at a step S6 that the encoding process for 1 VOBU is ended, a step S8 is executed to carry out the pack order determination process.

The pack order determination simulating section 24 carries out the simulation of the pack order determination. Each time the encoding process for 1 VOBU (1 GOP) is ended, a pack order selection process of the pack order determination process is carried out to determine a multiplexing order of the audio packs and the video packs. The overview of the pack order selection process is as follows.

The total code quantity of 1 GOP of video elementary stream (ES) and the total code quantity of audio elementary stream (ES) are acquired in the units of access units (AU). Until the process for the number of packs for 1 VOBU ends, the following operation is repeatedly carried out.

The navigation pack NV_PCK is selected if the pack number is #0, and a video pack V_PCK is selected if the pack number is #1. This pack order is defined in the DVD video standard. When the pack number is other than #0 and #1, the audio pack A_PCK is selected, if the overflow does not occur in the virtual buffer for the audio data. When the audio pack A_PCK is not outputted, the video pack V_PCK is selected if the virtual buffer of the video data does not overflow. When neither of the audio pack A_PCK and the video pack V_PCK can be selected during these selection processes, that is, the virtual buffer overflows, the system clock rate (SCR) needs to be adjusted to provide a space for the packs in either of the audio virtual buffer or the video virtual buffer. To adjust the system clock rate SCR, a dummy packs D_PCK is selected.

Next, the above-mentioned pack order determination simulation process will be described in detail, with reference to FIGS. 7A and 7B, 8 and 9.

Figures 7, 7A:
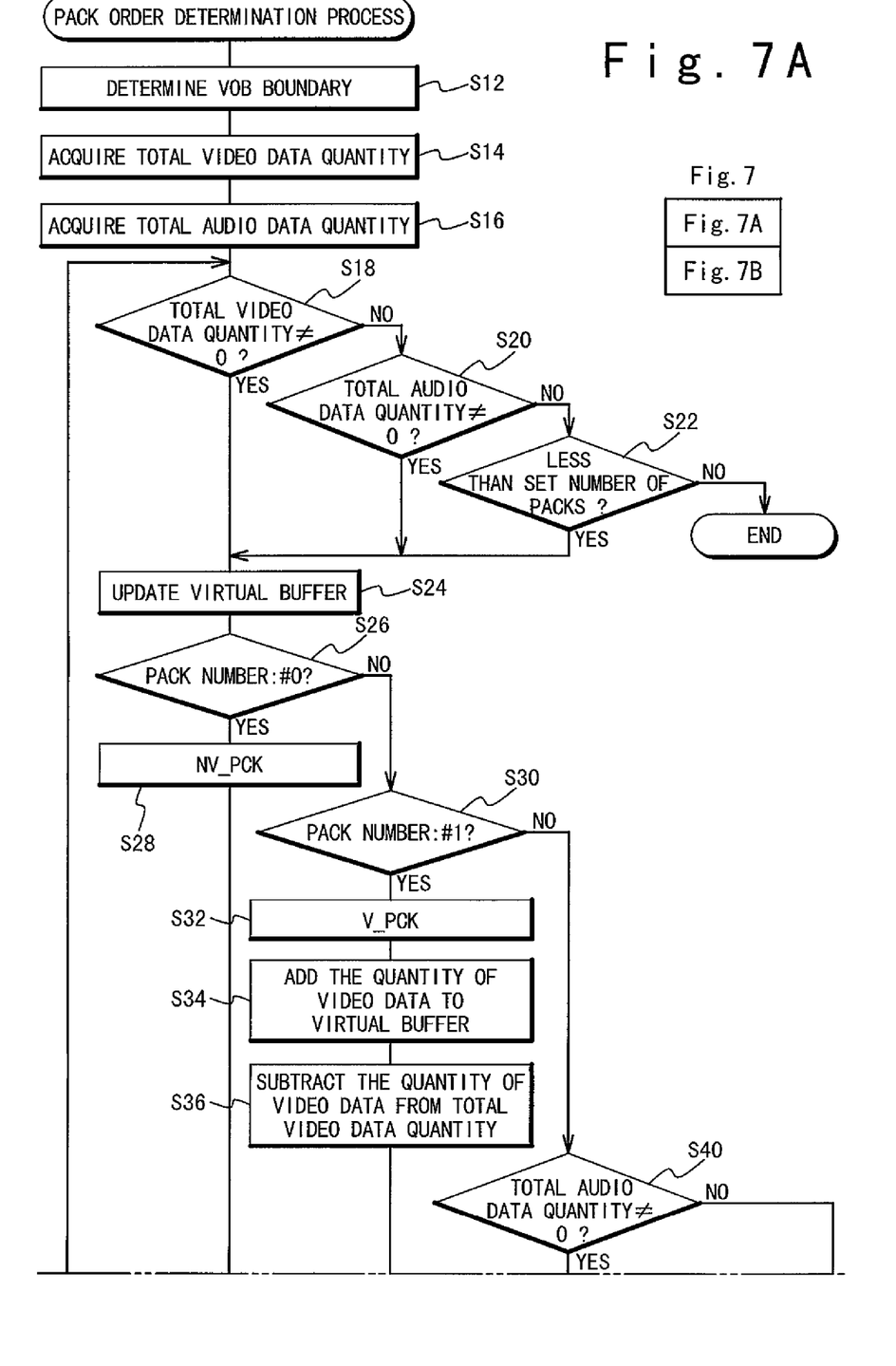
FIGS. 7A and 7B are a flow chart showing a pack order determination process.
Figure 7B:
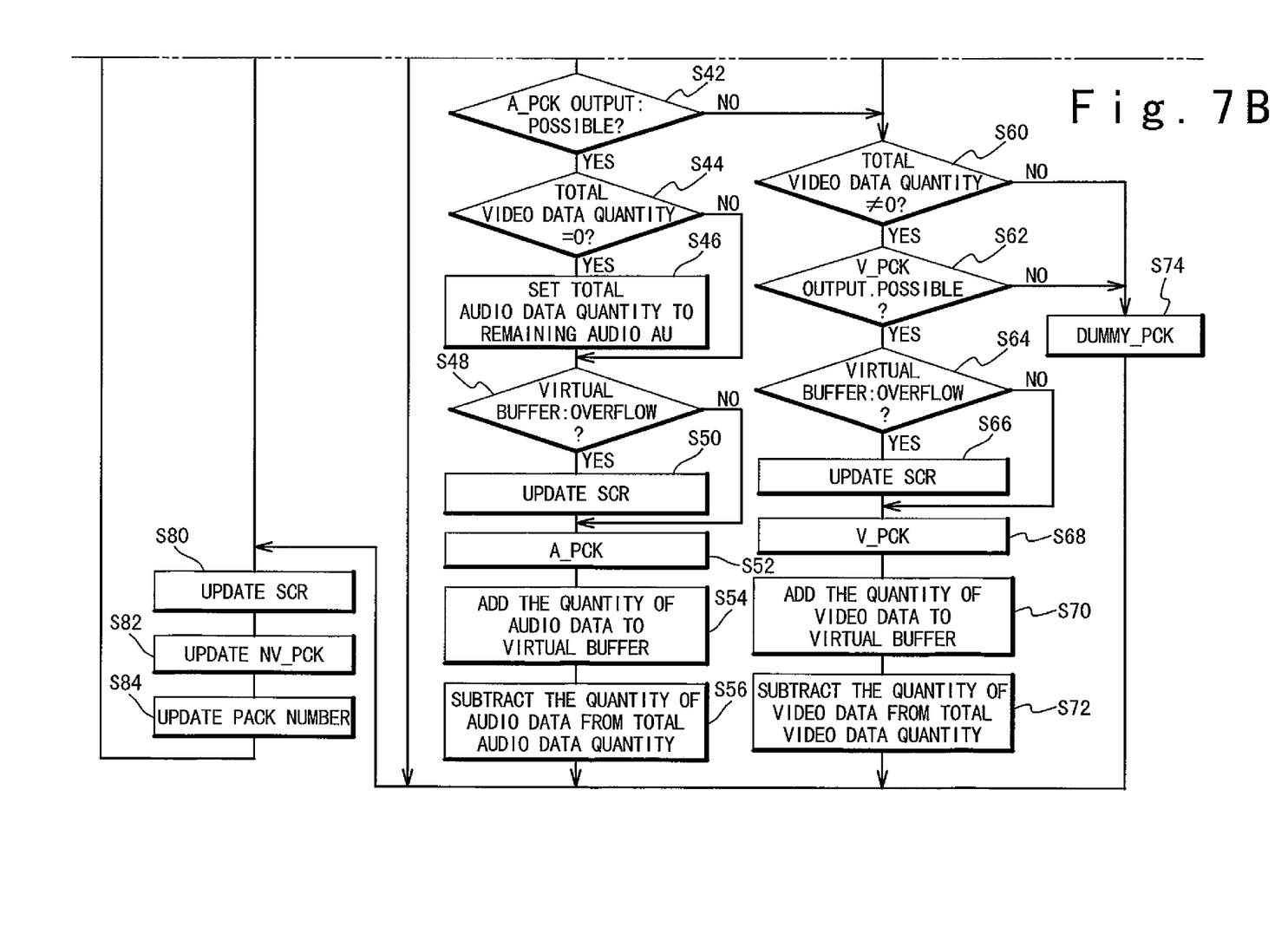

First, the pack order determination process will be described in detail with reference to FIGS. 7a and 7B.

At a step S12, the boundary of VOB (video object) is determined. This is possible from the determined number of packs and the pack size. The value of 1 VOBU is fixed while data is encoded to generate the data stream. Therefore, the address of following VOBU can be determined while the process of one VOBU is carried out. Subsequently, the total video data quantity stored in the stream buffer 4 is acquired at a step S14 and the total audio data quantity is acquired at a step S16.

Next, whether the total video data quantity is not 0 is determined at a step S18. If the total video data quantity is not 0, the process flow advances to a step S24. If it is determined at the step S18 that the total video data quantity is 0, the process flow advances to a step S20. At the step S20, it is determined whether the total audio data quantity is not 0. If the total audio data quantity is not 0, the process flow advances to the step S24. When the total audio data quantity is determined to be 0 at the step S20, a step 22 is subsequently executed. At the step S22, whether the number of packs is less than a predetermined pack number is determined. When the number of packs is determined to be not less than the predetermined pack number, the process flow ends. On the other hand, when the number of packs is determined to be less than the predetermined pack number, the process flow advances to the step S24.

Through the above process, whether the process for 1 VOBU or 1 GOP is ended is determined.

At the step S24, the virtual buffer is updated. Subsequently, at a step S26, whether or not the pack number is pack #0 is determined. If the pack number in VOBU is #0, the pack is set as the navigation pack NV_PCK at a step S28. Subsequently, the process flow advances to a step S80. In this way, it is always generated such that the navigation pack NV_PCK is at the head of VOBU.

When the pack number is determined to be not #0 at the step S26, a step S30 is executed. At a step S30, whether the pack number is #1 is determined. If the pack number is #1, the pack is set as a video pack V_PCK at the step S32. After that, the quantity of video data of the video pack V_PCK is added to the storage quantity in the virtual buffer for the video data at s step S34. Also, the quantity of video data is subtracted from the total video code quantity at a step S36. After that, the process flow advances to the step S80. Through this process, a video pack V_PCK always exists after the navigation pack NV_PCK of VOBU.

When the pack number is determined to be not #1 at the step S30, a step S40 is executed. Whether the total audio data quantity is not 0 is determined at the step S40. When the total audio data is 0, the process flow advances to a step S60. Whether or not it is possible to output the audio pack A_PCK is determined at the step S42 when the total audio data is not 0. When the output of the audio pack A_PCK is not possible, the process flow advances to the step S60. When the output of the audio pack A_PCK is possible, the process flow advances to a step S44. At the step S44, whether or not the total video data quantity is equal to 0 is determined. When the total audio data quantity is not equal to 0, the process flow advances to a step S48. When the total audio data is equal to 0, it is set at the step S46 that the total audio data quantity is equal to a remaining audio quantity access unit (AU).

At a step S48, whether or not the virtual buffer overflows is determined. If the virtual buffer does not overflow, the process flow advances to a step S52. When the virtual buffer overflows, a system clock rate SCR is updated at the step S50. Subsequently, the audio pack A_PCK is output at the step S52. Also, the quantity of audio data is added to the storage quantity the virtual buffer for the audio data at the step S54. The quantity of audio data to be transferred from the total audio data quantity is subtracted at the step S56. After that, the process flow advances to the step S80.

At the step S60, whether or not the total video data quantity is not 0 is determined. When the total video data quantity is 0, the process flow advances to a step S74. When the total video data quantity is not 0, whether or not it is possible to output a video pack V_PCK is determined at the step S62. When the output of the video pack V_PCK is not possible, the process flow advances to the step S74. When the output of the video pack V_PCK is possible, whether or not the virtual buffer for the video data overflows is determined at a step S64. If the video data virtual buffer does not overflow, the process flow advances to the step S68. When the virtual buffer overflows, a system clock rate SCR is updated at the step S66. Subsequently, the video pack V_PCK is outputted at the step S68. Also, the quantity of video data is added to the storage quantity in the virtual buffer at the step S70. The quantity of video data to be transferred is subtracted from the total video data quantity at the step S72. After that, the process flow advances to the step S80. At a step S74, a dummy pack D_PCK is outputted.

In this way, the kind of the pack to be outputted is determined based on the total video data quantity and the total audio data quantity.

At the step S80, the system clock rate SCR is updated. At a step S82, the parameters of the navigation pack NV_PCK are updated. Subsequently, at a step S84, the pack number is updated. After that, the process flow returns to the step S18 and the above-mentioned steps are repeated.

Figure 8:
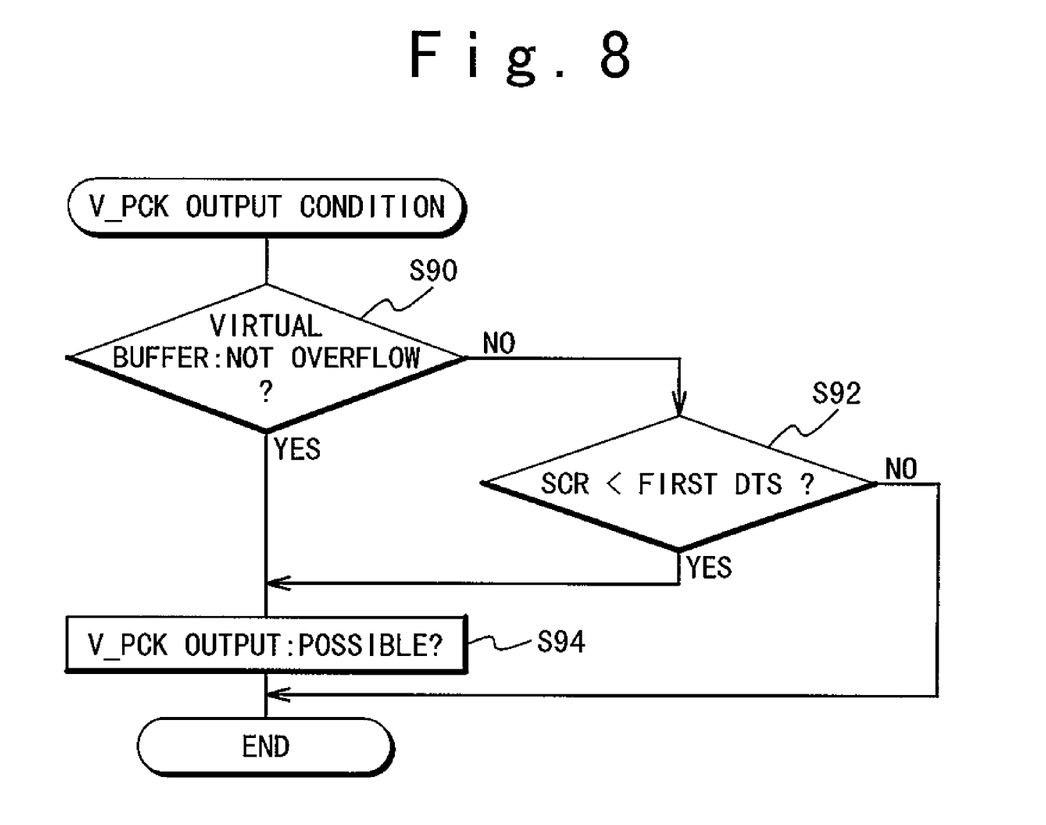
FIG. 8 is a flow chart showing the output setting process of the video pack video pack V_PCK.

Next, the determining process of whether it is possible to output the video pack V_PCK in FIGS. 7A and 7B will be described with reference to FIG. 8.

At a step S90, whether or not the video data virtual buffer does not overflow is determined. When the video data virtual buffer does not overflow, a step S94 is executed. When the video data virtual buffer overflows, whether or not the system clock rate SCR is less than the first decoding time stamp (DTS) is determined at the step S92. When it is determined to be not less than the first decoding time stamp (DTS), the process flow is ended. When the system clock rate SCR is determined to be less than the first decoding time stamp (DTS) at the step S92, a step S94 is executed. At the step S94, the video pack V_PCK is set to the state in which it is possible to output. In this way, the video pack V_PCK is set to the output possible state.

Figure 9:
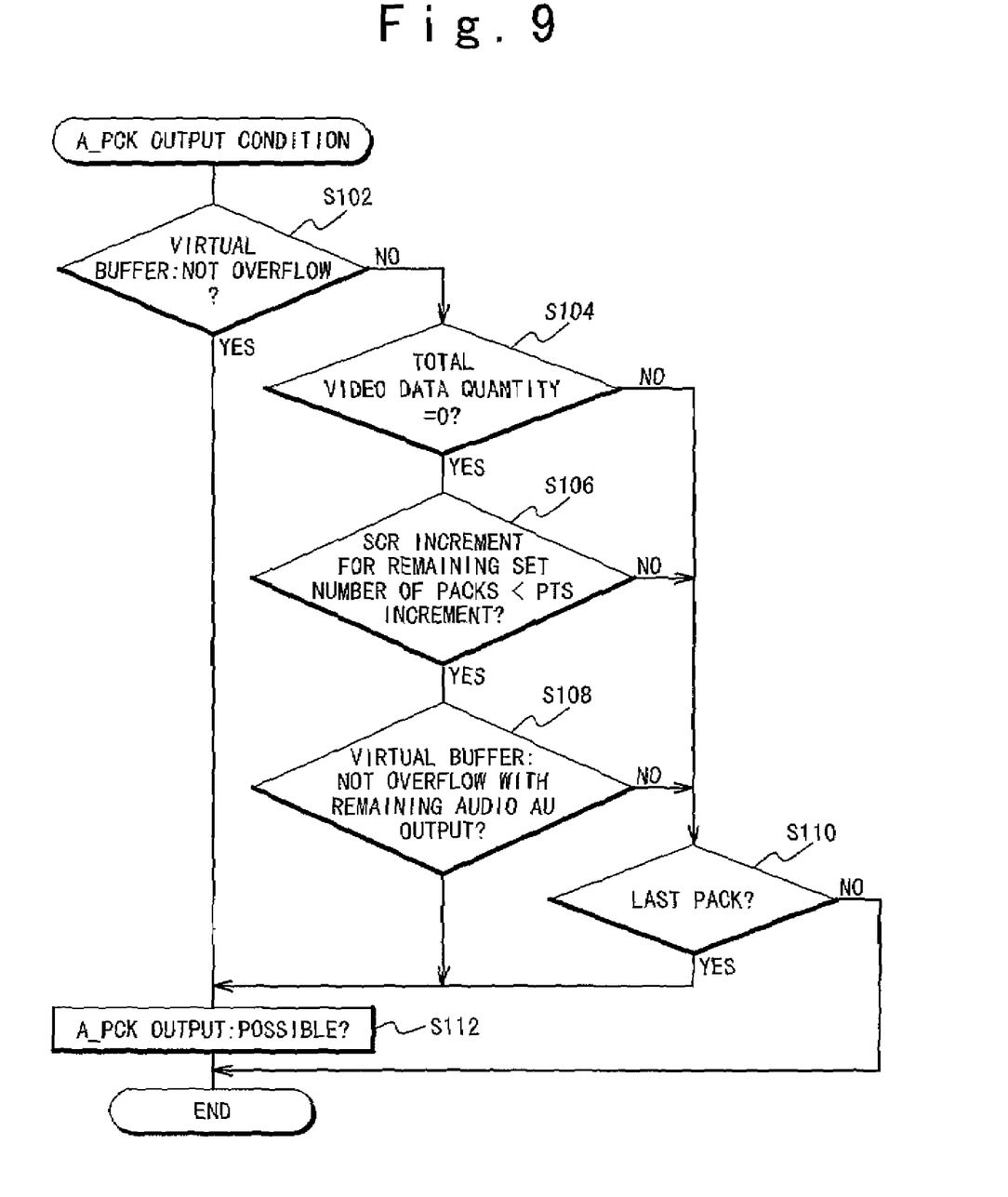
FIG. 9 is a flow chart showing the output setting process of the audio pack audio pack A_PCK.

Next, the determining process of whether or not it is possible to output the audio pack A_PCK will be described with reference to FIG. 9.

At a step S102, whether or not the audio data virtual buffer does not overflow is determined. When the audio data virtual buffer does not overflow, the process flow advances to a step S112. When the audio data virtual buffer overflows, whether or not the total video data quantity is 0 is determined at the step S104. When the total video data quantity is not 0, the process flow advances to a step S110. When the total video data quantity is 0, whether or not the system clock rate SCR increment for the set number of the remaining packs is less than a presentation time stamp (PTS) increment is determined. When the system clock rate SCR increment is not less than the presentation time stamp (PTS) increment, the process flow advances to the step S110. When the system clock rate SCR increment is less than the presentation time stamp (PTS) increment, whether or not the audio data virtual buffer overflows because of the remaining access unit (AU) output is determined at the step S108. When the audio data virtual buffer overflows, the process flow advances to the step S110. When the audio data virtual buffer does not overflow, the process flow advances to the step S112. At the step S110, whether or not the pack is the last pack is determined. When the pack is determined not to be the last pack, the process flow ends. When the pack is determined to be the last pack, the process flow advances to the step S112. At the step S112, the audio pack A_PCK is set to the output possible state. After that, the process flow ends. In this way, the audio pack A_PCK is set to the output possible state.

Next, the parameter updating section 26 updates the parameters of the navigation pack NV_PCK. To describe a relative address and time data of the picture in VOBU generated at present, the parameter updating section 26 updates the parameters of the navigation pack NV_PCK. Also, because the number of packs in VOBU can be calculated, the address of VOBU in the future is also updated.

Lastly, a pack output process for 1 VOBU (1 GOP) is carried out. A simulation is carried out at this time to confirm whether the virtual buffer overflows or underflows about the audio data and the video data. Thus, the data stream can be outputted in the higher safety.

Figure 10:
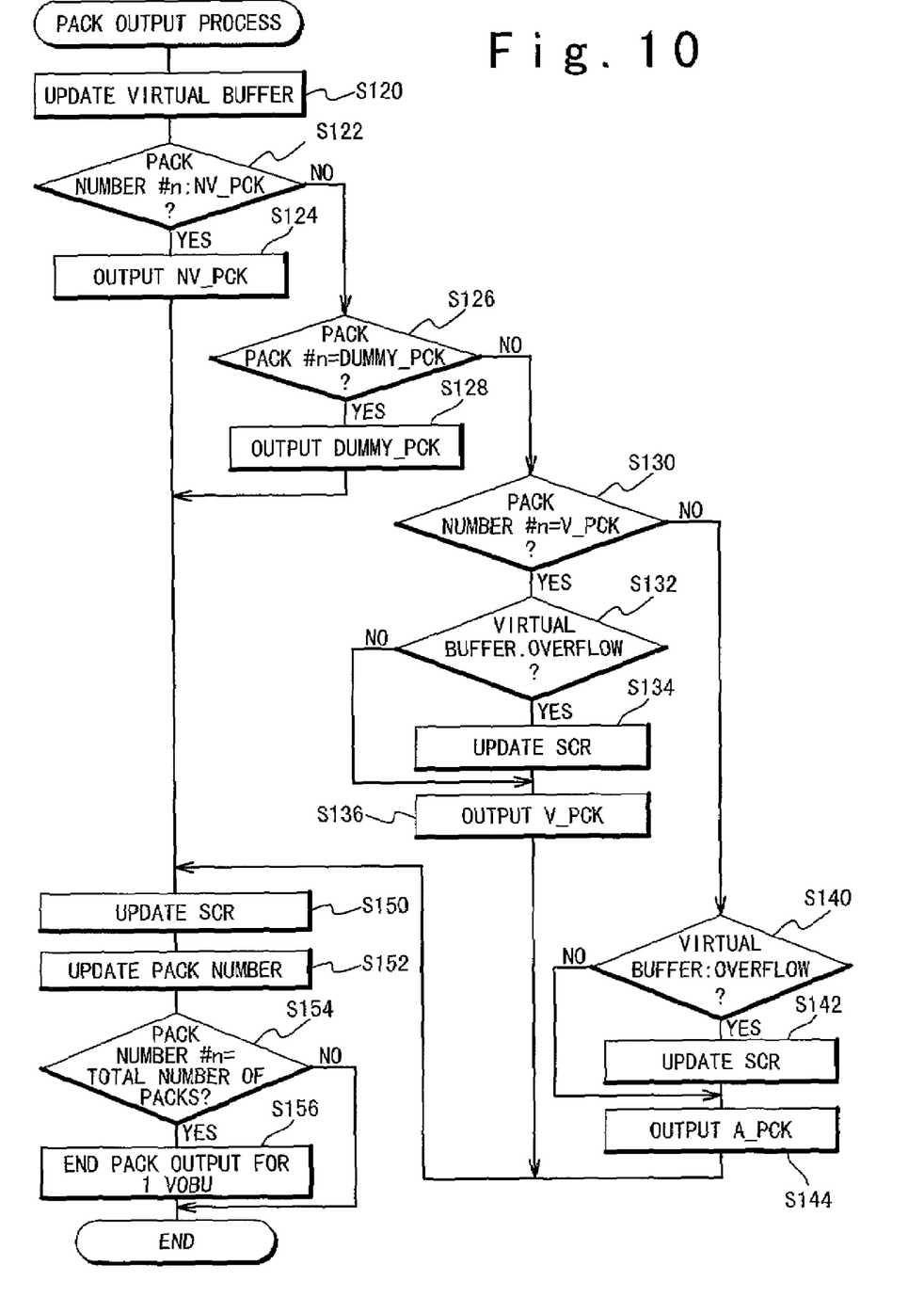
FIG. 10 is a flow chart showing pack output process.

Next, a pack output process by the virtual buffer simulating section 28 will be described in detail with reference to FIG. 10.

At a step S120, the virtual buffer is updated. Subsequently, whether or not the pack specified by the current pack number #n is the navigation pack NV_PCK is determined at a step S122. When the pack is determined not to be the navigation pack NV_PCK, the process flow advances to a step S126. When the pack specified by the pack number #n is the navigation pack NV_PCK, the navigation pack NV_PCK specified by #n is outputted at a step S124. After that, the process flow advances to a step S150.

At the step S126, whether or not the pack specified by the pack number #n is a dummy pack D_PCK is determined. When the pack is determined not to be the dummy pack D_PCK, the process flow advances to a step S130. When the pack is determined to be the dummy pack D_PCK, the dummy pack D_PCK is outputted at the step S128. After that, the process flow advances to the step S150.

Whether or not the pack specified by the pack number #n is a video pack V_PCK is determined at the step S130. When the pack is determined not to be the video pack V_PCK, the process flow advances to a step S140. When the pack is determined to be the video pack V_PCK, whether or not the virtual buffer overflows is determined at a step S132. When the overflow does not occur, the process flow advances to a step S136. When the overflow occurs, the system clock rate SCR is updated at the step S134. After that, the process of the step S136 is carried out. At the step S136, the video pack V_PCK is outputted. After that, the process flow advances to the step S150.

At the step S140, whether or not the virtual buffer overflows is determined. When the overflow does not occur, the process flow advances to a step S144. When the overflow occurs, the system clock rate SCR is updated at a step S142. Subsequently, the process of the step S144 is carried out. At the step S144, the audio pack A_PCK is outputted. After that, the process flow advances to the step S150.

At the step S150, the system clock rate SCR is updated, and at a step S152, a pack number is updated. Subsequently, whether or not the pack number is equal to the number of total packs is determined at the step S154. When it is determined not to be equal, the process ends. When it is determined to be equal, the output process of the 1 VOBU pack ends.

As described above, according to the present invention, even when the encoding operation is carried out at an optional bit rate of the DVD video standard, the appropriate navigation pack NV_PCK can be generated in real time for every VOBU, and it can be reflected in the stream.

Also, because the buffer is provided which can accumulate a stream more than 1 VOBU (1 GOP), the pack order in the 1 VOBU can be simulated. Also, because the delay is obtained of the output timing of the navigation pack NV_PCK, information in the current VOBU can be reflected in the navigation pack NV_PCK.

The number of packs in 1 VOBU is calculated and fixed. Therefore, data in future can be reflected to the current navigation pack NV_PCK.

What is claimed is:

1. A data stream generating apparatus, comprising:
    a control module for generating a video elementary stream from inputted video data, and for generating an audio elementary stream from inputted audio data;
    wherein the control module is configured to provide an output data stream, said output data stream including a plurality of units, each unit of the plurality of units of the output data stream having a same size;
    wherein the control module is configured to determine an output order of a navigation pack, a plurality of video packs generated from said video elementary stream, and a plurality of audio packs generated from said audio elementary stream based on said size of each unit of the plurality of units of the output data stream;
    wherein each unit of the plurality of units of the output data stream is large enough to include at least one video pack of the plurality of video packs and at least one audio pack of the plurality of audio packs;
    wherein the control module is configured to output said navigation pack, said plurality of video packs, and said plurality of audio packs as at least a portion of the output data stream in accordance with said output order, said control module configured to output the navigation pack in a particular unit of the plurality of units of the output data stream;
    wherein the control module is configured to provide certain data only in the navigation pack before the navigation pack is first output in the output data stream, said certain data identifying both (i) a timing of occurrence of a certain unit of the plurality of units in the output data stream and (ii) an address of the certain unit of the plurality of units in the output data stream, said certain unit output after said particular unit in the output data stream,
    wherein the certain data is not provided in said video packs or said audio packs;
    wherein said control module is configured to determine said output order while carrying out a simulation to know whether or not a first virtual buffer overflows; and
    wherein the simulation is utilized to determine a multiplexing order of the audio packs and the video packs.

2. The data stream generating apparatus according to claim 1, further comprising:
    a storage unit for storing at least portions of the video elementary stream and the audio elementary stream, said storage unit having a storage capacity more than said size of each unit of the plurality of units of the output data stream;
    wherein the size of each unit of the plurality of units of the output data stream is 1 VOBU (video object unit) or 1 GOP (group of picture).

3. The data stream generating apparatus according to claim 1,
    wherein said size of each unit of the plurality of units of the output data stream is equal to a total size of a given number of packs, and wherein the certain unit corresponds to a VOBU that will next occur in the output data stream.

4. The data stream generating apparatus according to claim 3,
wherein said control module determines said given number of packs based on a bit rate of the video data, a bit rate of the audio data, and a frame rate of the video data.

5. The data stream generating apparatus according to claim 1,
wherein said control module is configured to determine said output order while adding a dummy pack when said first virtual buffer overflows.

6. The data stream generating apparatus according to claim 1,
wherein said control module is configured to determine said output order such that said navigation pack is first outputted, a first one of said plurality of video packs is second outputted, each of a third pack and subsequent packs is one of said plurality of audio packs when the audio pack can be outputted, one of remaining video packs when the audio pack cannot be outputted and the video pack can be outputted, and a dummy pack when both of the audio pack and the video pack cannot be outputted.

7. The data stream generating apparatus according to claim 6,
wherein said control module is configured to update said navigation pack when said output order of said navigation pack, said plurality of video packs, said plurality of audio packs, and said dummy packs is determined.

8. A data stream generating apparatus, comprising:
a control module for generating a video elementary stream from inputted video data, and for generating an audio elementary stream from inputted audio data;
wherein the control module is configured to provide an output data stream, said output data stream including a plurality of units, each unit of the plurality of units of the output data stream having a same size;
wherein the control module is configured to determine an output order of a navigation pack, a plurality of video packs generated from said video elementary stream, and a plurality of audio packs generated from said audio elementary stream based on said size of each unit of the plurality of units of the output data stream;
wherein each unit of the plurality of units of the output data stream is large enough to include at least one video pack of the plurality of video packs and at least one audio pack of the plurality of audio packs;
wherein the control module is configured to output said navigation pack, said plurality of video packs, and said plurality of audio packs as at least a portion of the output data stream in accordance with said output order, said control module configured to output the navigation pack in a particular unit of the plurality of units of the Output data stream,
wherein the control module is configured to provide certain data only in the navigation pack before the navigation pack is first output in the output data stream, said certain data identifying both (i) a timing of occurrence of a certain unit of the plurality of units in the output data stream and (ii) an address of the certain unit of the plurality of units in the output data stream, said certain unit output after said particular unit in the output data stream;
wherein the certain data is not provided in said video packs or said audio packs; and
wherein said control module is configured to output said navigation pack, said plurality of video packs, and said plurality of audio packs as at least the portion of the output data stream based on the output order, while carrying out a simulation to know whether or not a virtual buffer overflows, wherein a system clock rate for outputting the video packs and the audio packs is adjusted based on results of the simulation.

9. A data stream generating method for a recording apparatus, the method comprising:
determining a number of packs for a unit size, said unit size being a size of each unit of a plurality of units of an output data stream;
generating a video elementary stream and an audio elementary stream from video data and audio data;
generating a navigation pack;
determining an output order of said navigation pack, a plurality of video packs generated from said video elementary stream, and a plurality of audio packs generated from said audio elementary stream based on the unit size;
providing certain data only in the navigation pack before the navigation pack is first output in a particular unit of the plurality of units of the output data stream, said certain data identifying both (i) a timing of occurrence of a certain unit of the plurality of units in the output data stream and (ii) an address of the certain unit of the plurality of units in the output data stream, said certain unit output after said particular unit in the output data stream; and
outputting said navigation pack, said plurality of video packs, and said plurality of audio packs as at least a portion of the output data stream in accordance with the output order, wherein the certain data is not provided in said video packs or said audio packs,
wherein said determining the output order comprises:
determining the output order while carrying out a simulation to know whether or not a first virtual buffer overflows; and
determining a multiplexing order of the audio packs and the video pack based on results of the simulation.

10. The data stream generating method according to claim 9,
wherein at least portions of the video elementary stream and the audio elementary stream are stored in a storage unit;
wherein said storage unit has a storage capacity more than the unit size; and
wherein the unit size is 1 VOBU (video object unit) or 1 GOP (group of picture).

11. The data stream generating method according to claim 9, wherein said determining the number of packs comprises:
determining the number of packs for the unit sizes based on a bit rate of the video data, a bit rate of the audio data, and a frame rate of the video data.

12. The data stream generating method according to claim 9, wherein said determining the output order comprises:
determining the output order while adding a dummy pack when said first virtual buffer overflows.

13. The data stream generating method according to claim 9, wherein said determining the output order comprises:
determining the output order such that said navigation pack is first outputted, a first one of said plurality of video packs is second outputted, each of a third pack and subsequent packs is one of said plurality of audio packs when the audio pack can be outputted, one of remaining video packs when the audio pack cannot be outputted and the video pack can be outputted, and a dummy pack when both of the audio pack and the video pack cannot be outputted.

14. The data stream generating method according to claim 13, wherein said determining the output order comprises:

updating said navigation pack when said output order of said navigation pack, said plurality of video packs, said plurality of audio packs, and said dummy packs is determined.

15. A data stream generating method, comprising:

a drive unit on which a disk is set;

a data stream generating unit for outputting an output data stream generated from video data and audio data; and a control unit for controlling said drive unit to write said output data stream in said disk;

wherein said data stream generating unit comprises:

a control module for generating a video elementary stream from said video data, and for generating an audio elementary stream from said audio data;

wherein the control module is configured to provide the output data stream, said output data stream including a plurality of units, each unit of the plurality of units of the output data stream having a same size;

wherein the control module is configured to determine an output order of a navigation pack, a plurality of video packs generated from said video elementary stream, and a plurality of audio packs generated from said audio elementary stream based on said size of each unit of the plurality of units of the output data stream;

wherein each unit of the plurality of units of the output data stream is large enough to include at least one video pack of the plurality of video packs and at least one audio pack of the plurality of audio packs;

wherein the control module is configured to output said navigation pack, said plurality of video packs, and said plurality of audio packs as at least a portion of the output data stream in accordance with said output order, said control module configured to output the navigation pack in a particular unit of the plurality of units of the output data stream;

wherein the control module is configured to provide certain data only in the navigation pack before the navigation pack is first output in the output data stream, said certain data identifying both (i) a timing of occurrence of a certain unit of the plurality of units in the output data stream and (ii) an address of the certain unit of the plurality of units in the output data stream, said certain unit output after said particular unit in the output data stream, wherein the certain data is not provided in said video packs or said audio packs; and wherein said outputting step comprises:

outputting said navigation pack, said plurality of video packs, and said plurality of audio packs as at least the portion of the output data stream in accordance with the output order, while carrying out a simulation to know whether or not a virtual buffer overflows, wherein a system clock rate for outputting the video packs and the audio packs is adjusted based on results of the simulation.

* * * * *